W. E. WINSHIP.
BATTERY.
APPLICATION FILED JAN. 24, 1911.
1,106,125.
Patented Aug. 4, 1914
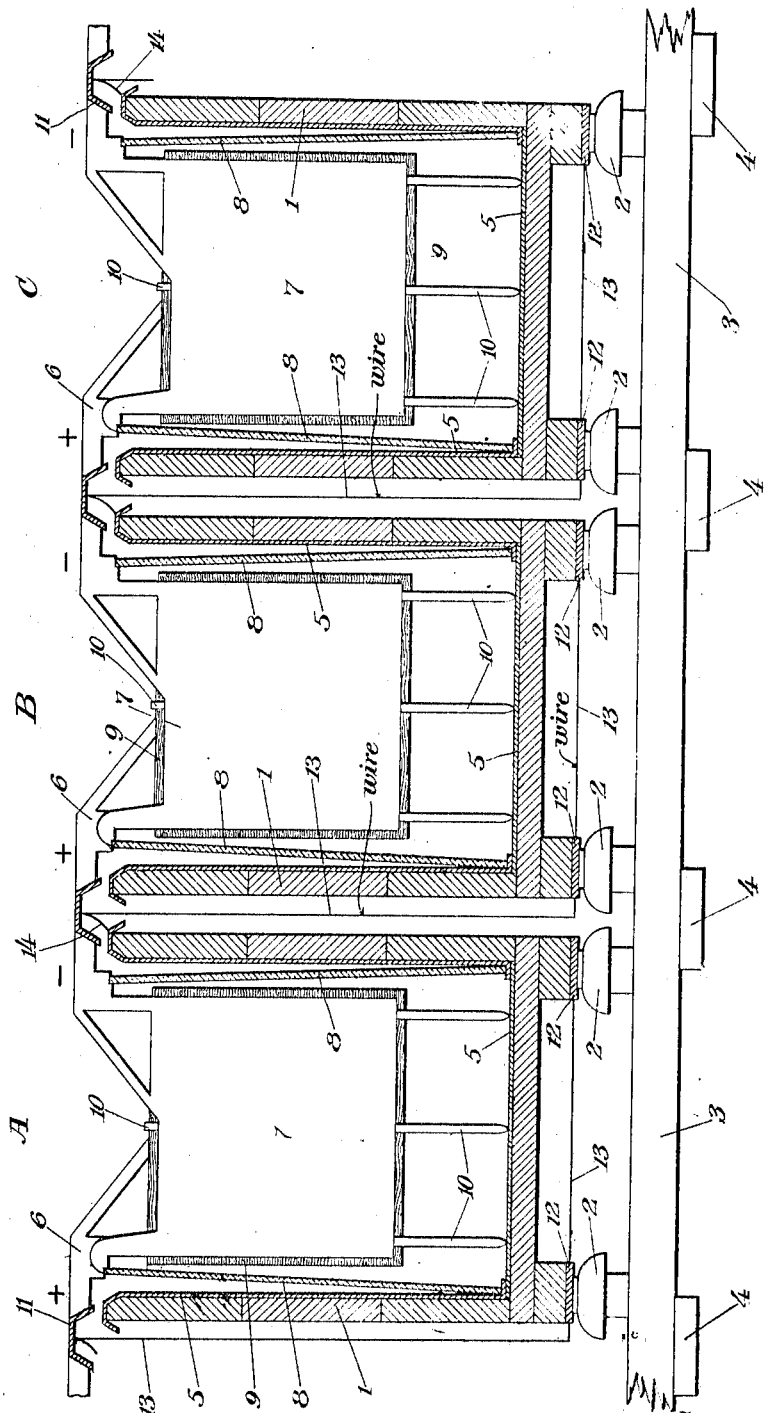

UNITED STATES PATENT OFFICE.

WALTER E. WINSHIP, OF NEW YORK, N. Y., ASSIGNOR TO GOULD STORAGE BATTERY COMPANY, A CORPORATION OF NEW YORK.

BATTERY.

1,106,125.  Specification of Letters Patent.  Patented Aug. 4, 1914.

Application filed January 24, 1911. Serial No. 604,316.

*To all whom it may concern:*

Be it known that I, WALTER E. WINSHIP, a citizen of the United States, and a resident of New York city, county and State of New York, have invented certain new and useful Improvements in Batteries, of which the following is a specification.

My invention relates to improvements in electrical batteries or cells and more especially to improvements for protecting the lead linings of storage battery cells from corrosion due to chemical or electrolytic action.

It is quite customary to provide storage battery cells comprising a wood tank with a lead lining, the tank of course containing the electrolyte and positive and negative elements. In such cases it has been found that the wood of the tank becomes more or less saturated with the acid of the electrolyte because of the acid spray given off by the electrolyte and the supporting means of the cells also becomes more or less conductive due to the deposition of acid or moisture. Thus, due to this or other leakage causes, a more or less conductive path is formed from the lining of one cell as a positive electrode to the lining of a cell which is at lower potential in the series, as a negative electrode of a couple. The current passing over such paths will gradually corrode the lead linings, due to the electrolytic action. The same corroding action may also take place in a single cell itself without the presence of other cells lower in series with it. This is due to contact of the lead lining with the acid absorbed by the wood of the tank which penetrates clear to the lead lining. This action is like or similar to that when a piece of lead is immersed in sulfuric acid.

One object of my invention is to avoid the above corrosive action upon such linings or coatings.

A further object of my invention is, while preventing leakage currents as much as possible, to provide an arrangement which is simple and easy of construction and economical in construction and operation.

Further objects, features and advantages will more clearly appear from the detail description given below taken in connection with the accompanying drawing, which forms a part of this specification, and which represents a section through a series of storage battery cells embodying my invention in one form, certain features being shown diagrammatically.

Referring to the drawings, A, B and C are three storage battery cells connected in electrical series. Each cell comprises a wooden tank 1 supported by petticoat glass insulators 2, the insulators 2 being supported by wood stringers 3 which are supported upon pieces of vitrified brick or tile 4. Each tank 1 has a lead lining 5. The positive and negative plates 6 and 7 respectively, which form the positive and negative elements of the cells are supported by glass plates 8. The positive plates 6 are separated from the negative plates 7 by sheets 9 of wood veneer supported between the plates by slotted dowels 10. The plates are suitably connected by bus bars 11. Over each of the insulators 2 and between the insulators and the bottom of the tank 1, I place small sheets of lead 12. These sheets of lead are placed on the outside surface of the cell and on the supports of each cell, so that they in turn support the cell. These sheets are connected electrically to the positive terminal or element of that cell by means of wires 13 and the lead lining 5 of each cell is electrically connected to the negative bus or element of the cell by means of a wire or connector 14.

The wood tank, partially saturated with the sulfuric acid forms an electrolyte of a couple consisting of the lead cushions or electrodes 12 and the tank lining 5. Under these conditions there is a tendency for current to flow from the lead cushions 12, which form an electrode on the outside of the tank 1, to the tank lining or container 5, but both of these become immediately polarized, so that only an extremely small current flows between the two.

If the difference of potential between any metal and an electrolyte (such as would otherwise corrode the metal) exceeds a certain value in the negative direction, the metal will no longer be corroded. Thus if lead be immersed in a dilute solution of sulfuric acid it will not be attacked by the sulfuric acid if polarized negatively. However, lead is ordinarily corroded to only a microscopic depth if it is immersed in sulfuric acid, as its surface becomes coated with an insoluble protective layer of lead sulfate, and the corrosion does not proceed further unless there is either a different acid present such as would form a soluble lead salt; or unless the lead is polarized positively; and in the latter case only under the condition that the difference of potential between the lead and the solution is below a certain critical value. If the difference of potential exceeds this value the layer of lead sulfate is converted into lead peroxid and this forms a protective layer and prevents further corrosion. Thus, as above pointed out, any current which would flow from the lead electrodes 12 to the tank lining 5 would cause both of these to become immediately polarized and the lead caps or electrodes 12 would tend to become corroded to lead sulfate, but I believe that under most conditions this layer would be oxidized to lead peroxid and thus limit the amount of corrosion that would take place. The tank lining 12 being kept negative with reference to the electrolyte permeating the wood tank, it will not be subject to the ordinary chemical corrosion, neither will it be subject to corrosion by electrolysis as it is polarized negatively or in the opposite direction for this to be possible. There may be small leakage currents from the lead caps 12 over the moist surfaces of the glass insulators 2 through the stringers 3 or ground from cell to cell, but any such leakage would be very small or negligible in comparison to that which would flow between the metallic electrodes 12 and the metallic tank lining 5 and thus would not work against the protection of the linings.

While I have described my improvements in great detail and with respect to one particular form of battery cell, nevertheless I do not desire to be limited to such details except as clearly pointed out in the appended claims.

Having thus clearly and fully described my invention with respect to one particular embodiment thereof, what I claim as new and desire to secure by Letters Patent, is:

1. A battery cell, comprising a wood tank having a lead lining, positive and negative plates in the tank, a negative and a positive terminal for the cell, insulators supporting said tank and electrodes situated between said insulators and the tank, said electrodes being connected electrically to the positive terminal of the cell and said lead lining being connected to the negative terminal of the cell.

2. A battery cell, comprising a tank having a lead lining, positive and negative elements in the cell, insulating means supporting said tank and an electrode placed between the insulating means and the tank, said electrode being electrically connected to the positive element of the cell and said lead lining being electrically connected to the negative element of the cell.

3. A battery cell, comprising a tank having a lead lining, positive and negative elements in the cell, insulating means supporting said tank and an electrode placed between the insulating means and the tank and means whereby said lead lining is polarized negatively with respect to said electrode so that corrosion of the exterior of said lining is prevented.

4. A battery cell, comprising a tank having a lead lining, positive and negative elements in the cell, an electrode on the outside of the tank and acting as the support for the tank, and means whereby said lead lining is polarized negatively with respect to said electrode so that corrosion of the exterior of said lining is prevented.

5. A battery cell, comprising a tank having a metallic lining, an electrode on the outside surface of the tank, and means whereby said lining is polarized negatively with respect to said electrode so that corrosion of the exterior of said lining is prevented.

6. A battery cell embracing a tank having a porous structure, a metallic lining for said tank, an electrode outside of and contacting with said tank, and means whereby said lining is polarized negatively with respect to said electrode to prevent corrosion of the lining.

7. A battery cell, comprising a tank having a porous structure, a metallic lining for said tank, negative and positive electrodes within said cell, an electrode outside of and contacting with said tank, said outside electrode being connected electrically with the positive terminal of the cell and said lining being connected with the negative terminal whereby corrosion of the lining is prevented.

In testimony whereof, I have signed my name to this specification, in the presence of two subscribing witnesses.

WALTER E. WINSHIP.

Witnesses:
GORHAM CROSBY,
EDWIN SEGER.